(12) United States Patent
Bouten

(10) Patent No.: US 11,910,792 B2
(45) Date of Patent: *Feb. 27, 2024

(54) TRI-DIRECTIONAL BREAK-AWAY BOOM ASSEMBLY

(71) Applicant: AGCO Corporation, Duluth, GA (US)

(72) Inventor: Petrus Henricus Johannes Bouten, Jackson, MN (US)

(73) Assignee: AGCO Corporation, Duluth, GA (US)

( * ) Notice: Subject to any disclaimer, the term of this patent is extended or adjusted under 35 U.S.C. 154(b) by 389 days.

This patent is subject to a terminal disclaimer.

(21) Appl. No.: 17/143,876

(22) Filed: Jan. 7, 2021

(65) Prior Publication Data

US 2021/0120804 A1  Apr. 29, 2021

Related U.S. Application Data

(63) Continuation of application No. 16/157,453, filed on Oct. 11, 2018, now Pat. No. 10,925,275, which is a continuation of application No. 15/533,437, filed as application No. PCT/US2015/067258 on Dec. 22, 2015, now Pat. No. 10,212,927.

(60) Provisional application No. 62/095,244, filed on Dec. 22, 2014.

(51) Int. Cl.
*A01M 7/00* (2006.01)
*A01C 23/00* (2006.01)

(52) U.S. Cl.
CPC ......... *A01M 7/0078* (2013.01); *A01C 23/008* (2013.01)

(58) Field of Classification Search
CPC . A01C 23/008; A01M 7/0078; A01M 7/0075; A01M 7/0053; A01M 7/0071; B05B 1/20; B60G 2300/08
See application file for complete search history.

(56) References Cited

U.S. PATENT DOCUMENTS

2008/0001004 A1*  1/2008  Ringer ................... B60K 17/16
                                                          239/146
2012/0237284 A1*  9/2012  Bouten ............... A01M 7/0075
                                                          403/111

FOREIGN PATENT DOCUMENTS

EP           1522218 A1 *  4/2005  .......... A01M 7/0014

* cited by examiner

*Primary Examiner* — Christopher R Dandridge

(57) ABSTRACT

A break-away apparatus for a boom arm is positioned at a joint between a main boom and a boom tip to allow the boom tip to assume a neutral position and forward, rearward, and upward positions. A hinge assembly is positioned between the boom tip and main boom. The hinge assembly includes an upper ball joint, a first hinge, and a second hinge. The boom tip is movable relative to the main boom about an axis of the first hinge, about an axis of the second hinge axis, and/or about a pivot defined by the upper ball joint. A first spring assists a return of the boom tip to the neutral position.

15 Claims, 10 Drawing Sheets

TRI-DIRECTIONAL BREAK-AWAY BOOM ASSEMBLY

CROSS-REFERENCE TO RELATED APPLICATIONS

This application is a continuation of U.S. patent application Ser. No. 16/157,453, filed Oct. 11, 2018, which is a continuation of U.S. patent application Ser. No. 15/533,437, filed Jun. 6, 2017, now U.S. Pat. No. 10,212,927, issued Feb. 26, 2019, which was a national phase entry under 35 U.S.C. § 371 of International Patent Application PCT/US2015/067258, filed Dec. 22, 2015, designating the United States of America and published in English as International Patent Publication WO 2016/106270 A1 on Jun. 30, 2016, which claims the benefit of U.S. Provisional Patent Application 62/095,244, "TRI-DIRECTIONAL BREAK-AWAY BOOM ASSEMBLY," filed Dec. 22, 2014. The entire disclosures of each of these applications are incorporated herein by reference.

FIELD

A crop sprayer, often in the form of an agricultural vehicle, sprays fluid including herbicides, pesticides, and fertilizers on agricultural crops in a field. The fluid may be sprayed from nozzles mounted on a boom on the crop sprayer. Large agricultural sprayers typically have horizontal booms to allow for extensive spray coverage of crops in a field with a single travel pass. In some cases, booms have a length between about 20 and about 150 feet.

BACKGROUND

With conventional crop sprayers, an operator may drive the crop sprayer forward in a field. As the crop sprayer moves in the field, the boom (or more specifically, a boom tip) may impact an obstacle (such as a tree, power pole, fence or post, for example), or force may otherwise be applied to the boom. This impact or force may damage the boom, the boom tip, and/or the obstacle.

In some commercially produced chemical application booms, the boom tips are configured to break away rearwardly as the sprayer moves forward. However, in some cases, such as when the sprayer travels backward, the boom encounters an obstacle wherein it is pushed forwardly. Moreover, an obstacle or other forces may push upwardly upon a boom tip. Many boom tips are not designed to break away forwardly or upwardly; thus, the boom may sustain extensive damage.

BRIEF SUMMARY

In one aspect, the invention is directed to a break-away apparatus in combination with a boom arm of a vehicle, the boom arm having a main boom portion and a boom tip. The apparatus is positioned at a joint between the main boom portion and the boom tip and allows the boom tip to assume a neutral position and to pivot to a forward position and to a rearward position and to an upward position with respect to the main boom portion. The apparatus has a first plate disposed at the joint, the first plate being attached to the main boom portion, and a second plate disposed at the joint, the second plate being attached to the boom tip. A breakaway hinge assembly is positioned between the first plate and the second plate. The breakaway hinge assembly has an upper joint having a first ball joint, the upper joint connected to both the main boom portion and the boom tip.

The breakaway hinge assembly has a first hinge having a first hinge pin connected to the first plate, the first hinge being pivotable about a first hinge axis defined between the first ball joint and the first hinge pin and a second hinge having a second hinge pin connected to the second plate, the second hinge being pivotable about a second hinge axis defined between the first ball joint and the second hinge pin. The first and second plates are in a first position with respect to each other when the boom tip assumes the neutral position, and wherein the first and second plates are movable with respect to each other about the first hinge axis, the second hinge axis, and a pivot point defined by the first ball joint. A first spring generates a holding force to provide a break away threshold, wherein the first and second plates are movable with respect to each other when the threshold is exceeded, and wherein the first spring assists a return of the first and second plates to the first position after the first and second plates move from the first position, A mid-joint is attached to the first plate, the mid-joint having a second ball joint, wherein the second ball joint is connected to the first spring with an elongated rod, wherein horizontal and vertical movement of the elongated rod is accommodated at the mid joint by the ball joint.

A hinge connecting bar may connect the first hinge pin and the second hinge pin and a first hinge seat attached to the second plate is shaped to receive a portion of the hinge connecting bar proximate the first hinge pin, and a second hinge seat attached to the first plate is shaped to receive a portion of the hinge connecting bar proximate the second hinge pin. The hinge assembly may further have a lever pivotally mounted to boom tip with a first pin connection and connecting the elongated rod to the first spring, wherein a first end of the first spring is pivotally mounted to the boom tip and a second end of the first spring is pivotally mounted to the lever at a second pin connection to move with lever. In one aspect, the lever has a triangular configuration with the first pin connection, a second pin connection and a third pin connection, with each of the three pin connections being pivotally mounted relative to the lever, wherein one end of the elongated rod connects to the third pin connection to connect the first spring to the lever.

In another aspect, a break-away apparatus is disclosed for a boom arm having a main boom portion and a boom tip. The apparatus is positioned at a joint between the main boom portion and the boom tip. The apparatus allows the boom tip to assume a neutral position and to pivot to a forward position and to a rearward position and to an upward position with respect to the main boom portion. The apparatus includes a first plate disposed at the joint, a second plate disposed at the joint, and a hinge assembly positioned between the first plate and the second plate. The hinge assembly includes a first ball joint, a first hinge pin connected to the first plate, a first hinge axis being defined between the first ball joint and the first hinge pin, and a second hinge pin connected to the second plate, a second hinge axis being defined between the first ball joint and the second hinge pin. The first and second plates are in a first position with respect to each other when the boom tip assumes the neutral position, and the first and second plates are movable with respect to each other about the first hinge axis, the second hinge axis, and a pivot point defined by the first ball joint. A first spring generates a holding force to provide a break away threshold, wherein the first and second plates are movable with respect to each other when the threshold is exceeded. Further, the first spring assists a return of the first and second plates to the first position after the first and second plates move from the first position. The hinge assembly includes a second ball joint, wherein an elongated member connects the second ball joint and the first spring.

In another aspect, a method of using a break-away apparatus for a boom arm is disclosed. The boom arm comprises a main boom portion and a boom tip. The apparatus is positioned at a joint between the main boom portion and the boom tip. The apparatus allows the boom tip to assume a neutral position and to pivot to a forward position and to a rearward position and to an upward position with respect to the main boom portion. The apparatus comprises a first plate disposed at the joint; a second plate disposed at the joint; and a hinge assembly positioned between the first plate and the second plate. The hinge assembly comprises a first ball joint; a first hinge pin connected to the first plate, a first hinge axis being defined between the first ball joint and the first hinge pin; a second hinge pin connected to the second plate, a second hinge axis being defined between the first ball joint and the second hinge pin; and a bar connecting the first hinge pin and the second hinge pin. The first and second plates are in a first position with respect to each other when the boom tip assumes the neutral position. The method comprises moving the second plate away from the first plate so that the first and second plates are in a second position with respect to each other.

This summary is provided to introduce concepts in simplified form that are further described below in the Detailed Description. This summary is not intended to identify key features or essential features of the disclosed or claimed subject matter and is not intended to describe each disclosed embodiment or every implementation of the disclosed or claimed subject matter. Specifically, features disclosed herein with respect to one embodiment may be equally applicable to another. Further, this summary is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

The disclosed subject matter will be further explained with reference to the attached figures, wherein like structure or system elements are referred to by like reference numerals throughout the several views.

While the above-identified figures set forth one or more embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art which fall within the scope and spirit of the principles of this disclosure.

The figures may not be drawn to scale. In particular, some features may be enlarged relative to other features for clarity. Moreover, where terms such as above, below, over, under, top, bottom, side, right, left, etc., are used, it is to be understood that they are used only for ease of understanding the description. It is contemplated that structures may be oriented otherwise.

DETAILED DESCRIPTION

A break-away assembly of the present disclosure allows a boom tip to break away to the rear or front or upwardly of the agricultural vehicle without damaging the agricultural vehicle or the boom arm when the boom tip impacts an obstacle or when a sufficient force is otherwise applied to the boom tip. Release of the boom tip diminishes the stress placed on the boom arm and mounting apparatus.

A boom arm with a tri-directional boom-tip break-away feature is described that can be used, for example, on liquid sprayers. A suitable liquid sprayer is disclosed in U.S. Patent Application Publication No. 2012/0237284, assigned to AGCO Corporation, and entitled "Boom fore and aft breakaway assembly," the disclosure of which is fully incorporated by reference herein. Another suitable liquid sprayer is disclosed in U.S. Pat. No. 7,823,803, assigned to AGCO Corporation, and entitled "Integrated breakaway cylinder and method for constructing a boom assembly," the disclosure of which is fully incorporated by reference herein. A boom arm of the present disclosure may be attached to a liquid sprayer by conventional means.

An exemplary break-away boom arm of the present disclosure allows the boom tip to hinge backward, forward, or upward when coming in contact with an obstruction in the field or when encountered by another obstacle or force. In one embodiment, the boom tip is connected to the main boom portion by a bi-directional hinge assembly and one or more ball socket joints. In one exemplary embodiment, rebound of the boom tip is dampened by a gas spring, which assists in bringing the boom tip back to center from either forward or rearward movement. Moreover, rebound of the boom tip from an upward break due to gravity is dampened by the gas spring.

Figure 1:
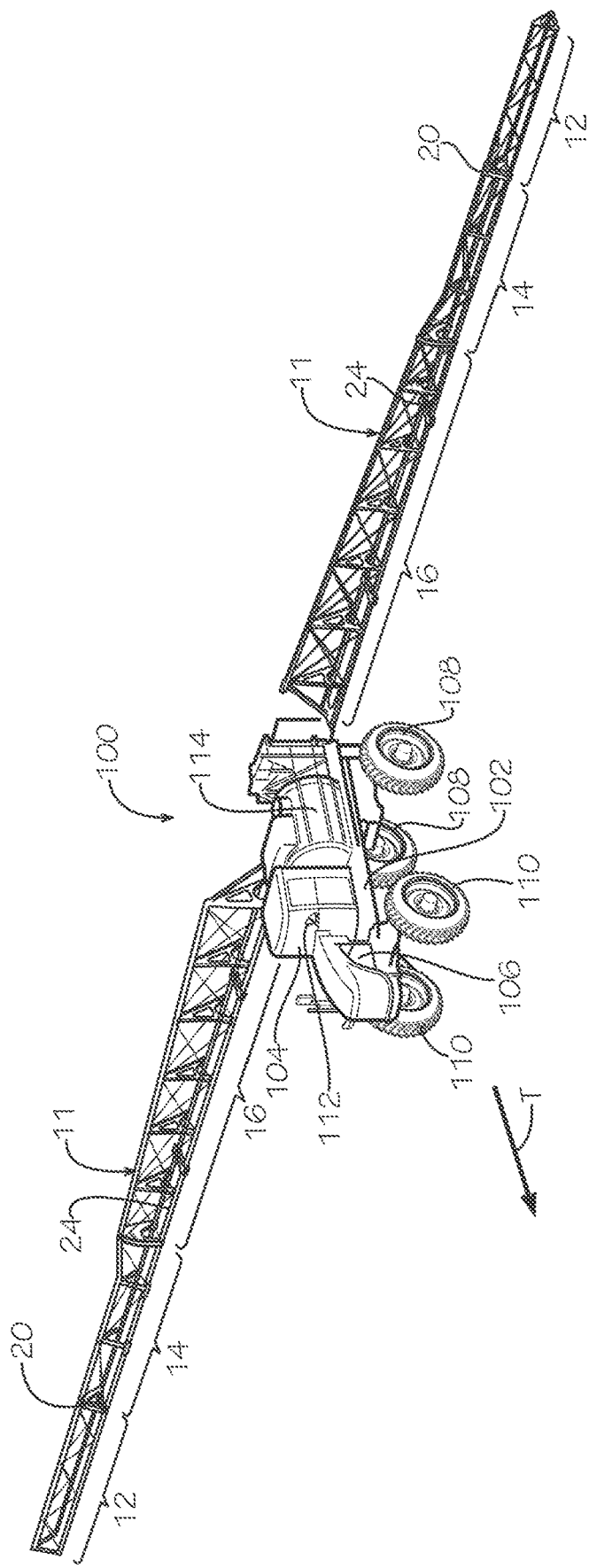
FIG. 1 is a front perspective view of a crop sprayer with exemplary boom arms of the present disclosure.
Figure 2:
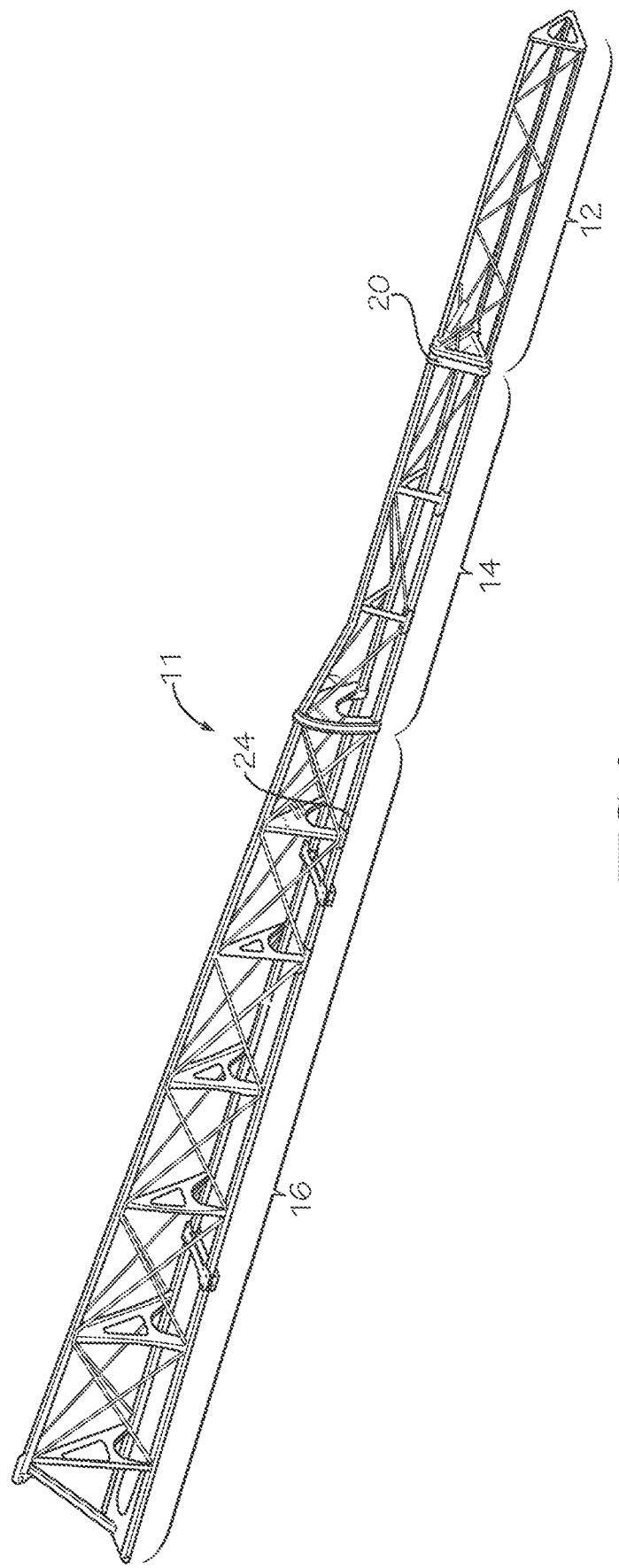
FIG. 2 is a front perspective view of a single exemplary boom arm.
Figure 3:
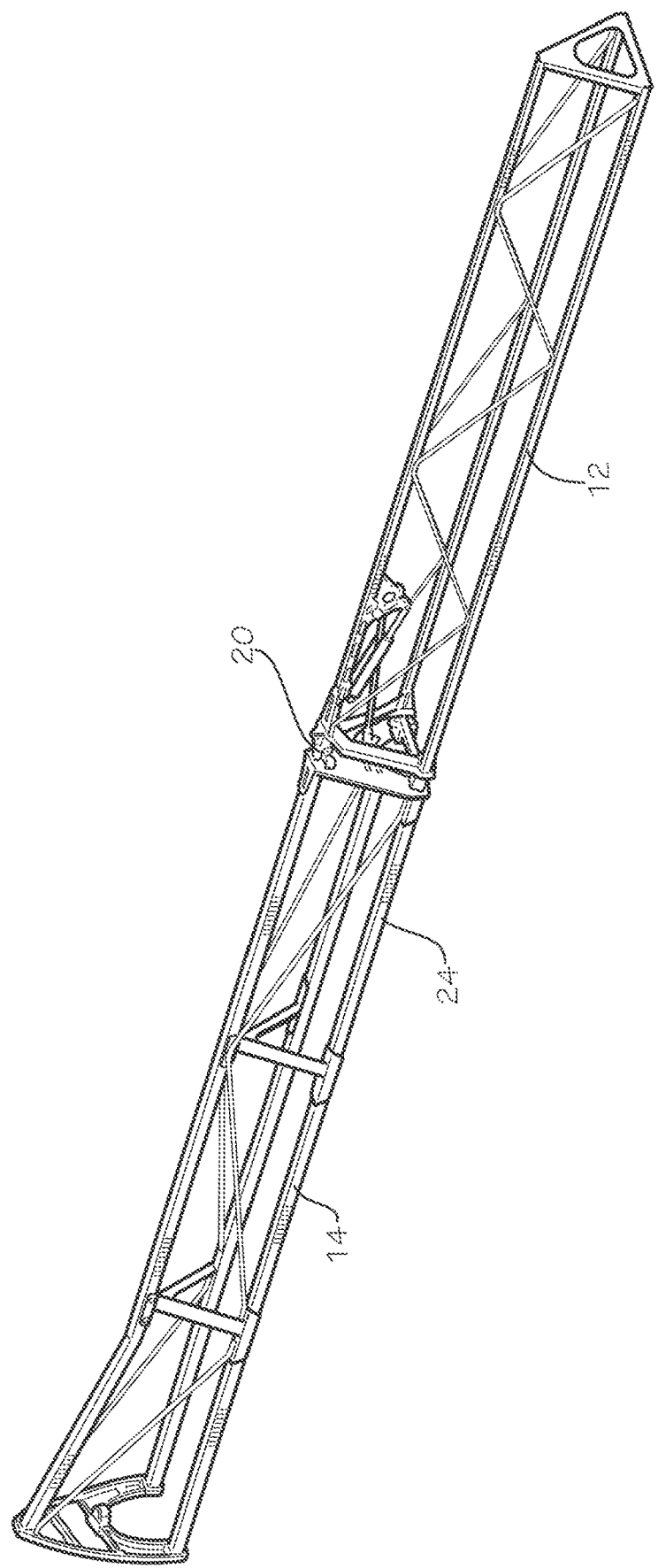
FIG. 3 is a front perspective view of an exemplary mid-boom section and boom tip of the boom arm of FIGS. 1 and 2.

FIG. 1 shows a crop sprayer 100 having a tri-directional break-away boom assembly of the present disclosure. Crop sprayer 100 includes a frame 102. Frame 102 may be of unitary construction or may include one or more pieces secured together. Typically, frame 102 includes a support that spans the length of crop sprayer 100 and provides a structure for mounting components of crop sprayer 100. Crop sprayer 100 generally also includes a cab 104 mounted on frame 102. Cab 104 houses an operator and the controls for crop sprayer 100.

An engine 106 may be mounted on a forward portion of frame 102 in front of cab 104 or may be mounted on a rearward portion of frame 102 behind cab 104. Engine 106 is commercially available from a variety of sources and may include, for example, a diesel engine or a gasoline-powered internal combustion engine. Engine 106 provides a motive force to propel crop sprayer 100 and also provides energy used to spray fluids from crop sprayer 100.

Frame 102 is supported by a pair of rear wheels 108 and a pair of front wheels 110. Rear wheels 108 (and/or front wheels 110) may be driven by engine 106 so as to propel crop sprayer 100. In particular, engine 106 may generate mechanical energy that may be transferred to rear wheels 108 (and/or front wheels 110) by a transmission, drive shaft, and rear (and/or front) differential. Front wheels 110 (and/or rear wheels 108) may be operable to steer crop sprayer 100. The propulsion and direction of crop sprayer 100 may be controlled by one or more operator controls that include, but are not limited to, an accelerator, a brake, a control handle, and a steering wheel 112.

Crop sprayer further includes a storage tank 114 for storing a fluid to be sprayed on a field. The fluid may include chemicals, such as but not limited to, herbicides, pesticides, or fertilizers. Storage tank 114 is usually mounted on frame 102, either in front of or behind cab 104. Crop sprayer 100 may include more than one storage tank 114 to store different chemicals to be sprayed on the field. The stored chemicals may be dispersed by crop sprayer 100 one at a time, or different chemicals may be mixed and dispersed together in a variety of mixtures.

Crop sprayer 100 further includes a pair of horizontally extending boom arms 11 that are operable to distribute the fluid over a wide swath in the field. In an exemplary embodiment, each boom arm 11 is a truss assembly of aluminum pieces that supports a plurality of liquid spray nozzles (not shown). The plurality of nozzles may be spaced along boom arm 11; fluid is sprayed through the nozzles as crop sprayer 100 is driven forward in direction T in the field to distribute the chemicals onto crops in the field. Typically, an operator of crop sprayer 100 uses a control handle, located in cab 104, to control fluid dispersion through the nozzles of boom arm 11. In an exemplary embodiment, each boom arm 11 includes boom tip 12, mid-boom section 14, and inner boom section 16. In an exemplary embodiment, a breakaway assembly 20 is positioned at a joint between boom tip 12 and mid-boom section 14. However, breakaway assembly 20 may also be positioned at a joint between mid-boom section 14 and inner boom section 16 or elsewhere along boom arm 11. In this discussion, the portion of boom arm 11 outward from break-away assembly 20 will be considered to be the "boom tip" and the portion of boom arm 11 inward from break-away assembly 20 (closer to frame 102) will be considered to be the "main boom portion."

In FIGS. 2-10, only a single boom arm 11 is illustrated and discussed. However, it is to be understood that in an exemplary embodiment, the left and right boom arms 11 shown in FIG. 1 are mirror images of each other.

Figure 4:
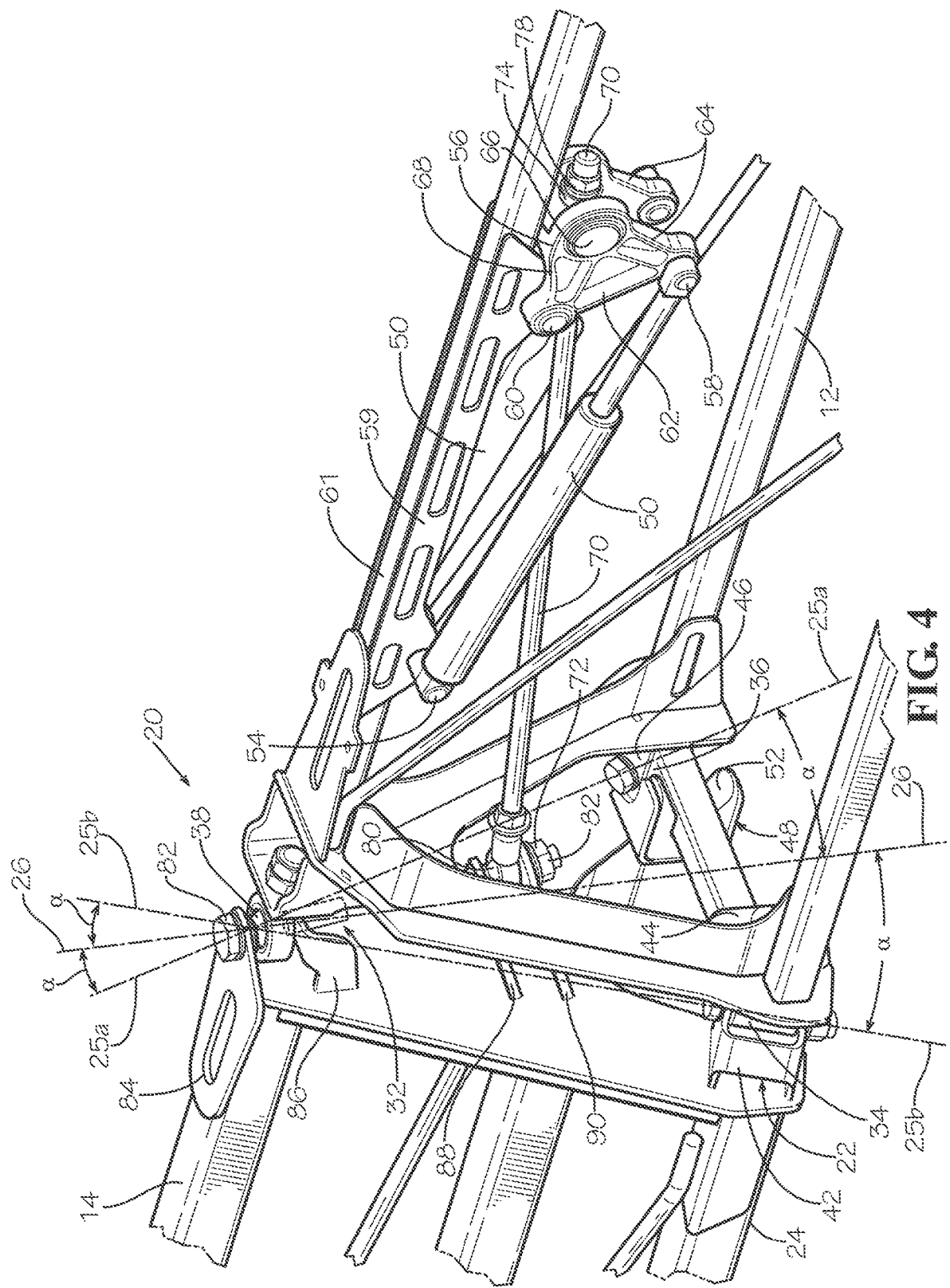
FIG. 4 is a front perspective view of a joint between the mid-boom section and the boom tip.
Figure 5:
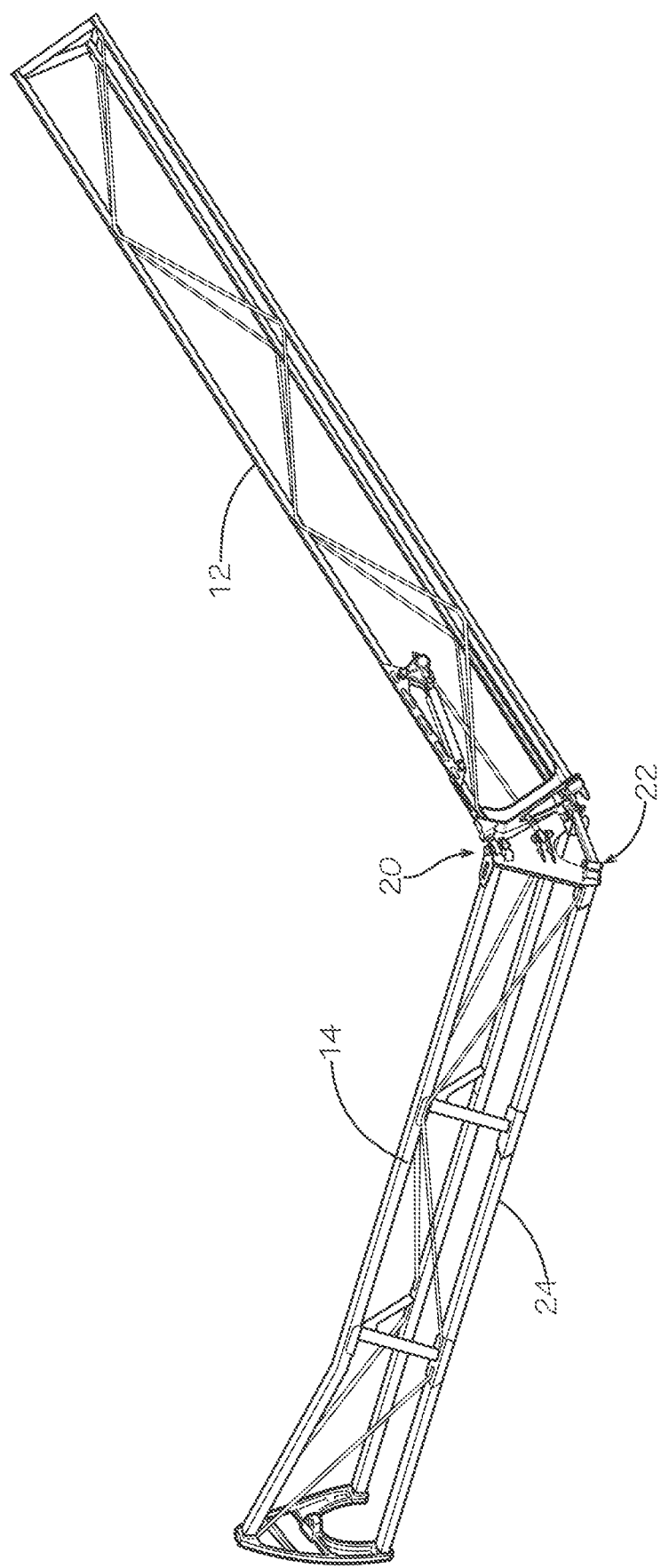
FIG. 5 is a front perspective view of the mid-boom section and boom tip of FIG. 3 in a rearward break configuration.
Figure 6:
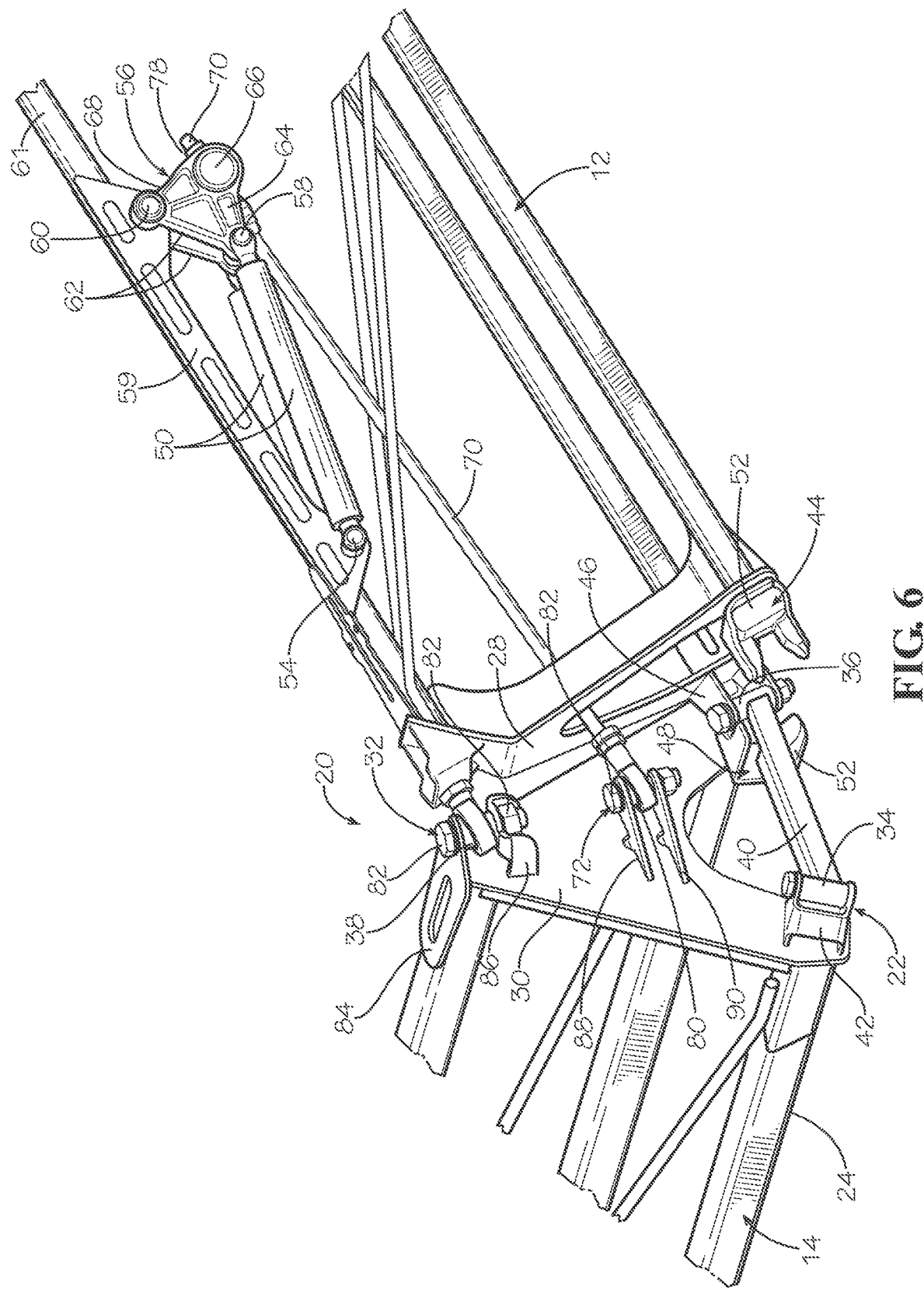
FIG. 6 is a front perspective view of a joint between the mid-boom section and the boom tip in the rearward break configuration of FIG. 5.
Figure 7:
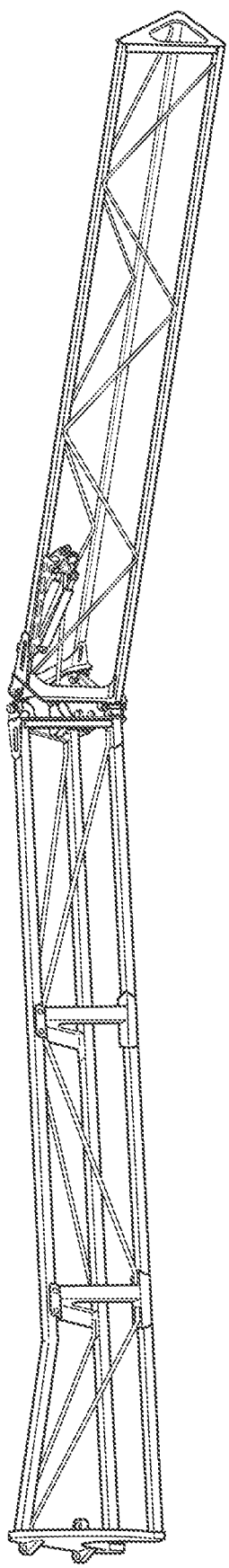
FIG. 7 is a front perspective view of the mid-boom section and boom tip in a forward break configuration.
Figure 8:
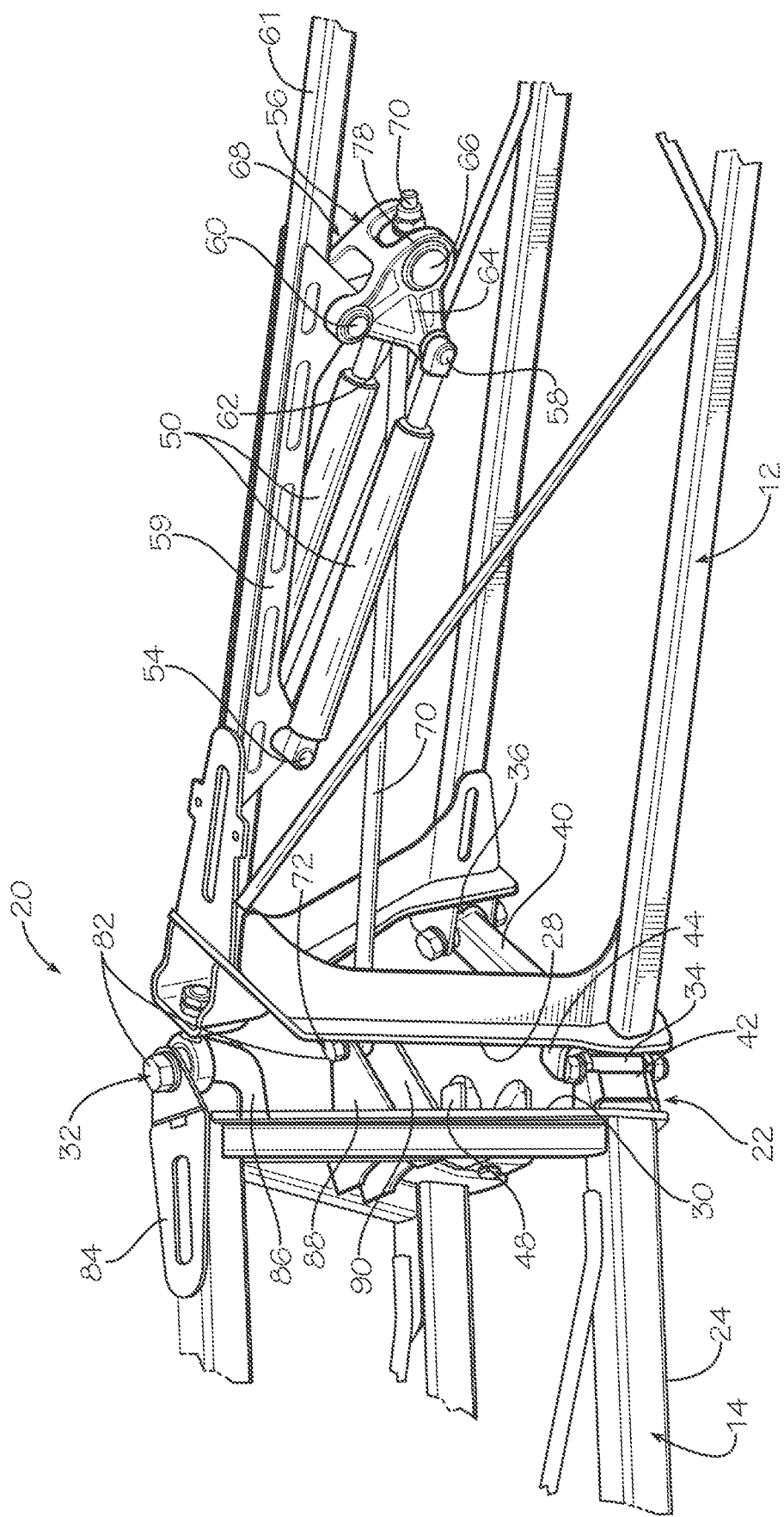
FIG. 8 is a front perspective view of a joint between the mid-boom section and boom tip in the forward break configuration of FIG. 7.
Figure 9:
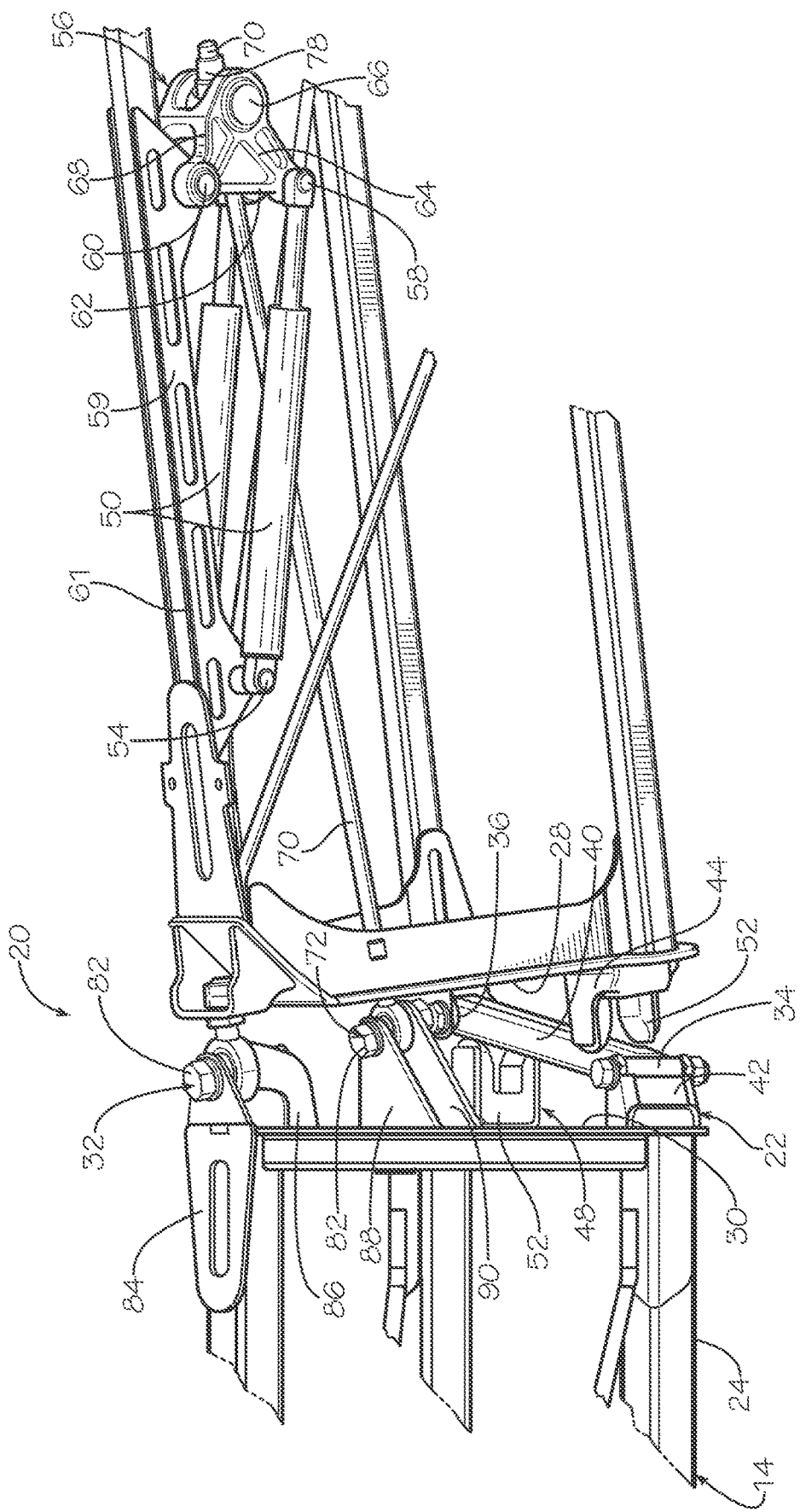
FIG. 9 is a front perspective view of a joint between the mid-boom section and the boom tip in an upward break configuration.

FIGS. 1-4 and 10 show views of horizontally extending boom arm 11 in a neutral position (i.e., with boom tip 12 not pivoted forward or backward or upward). FIG. 4 is an enlarged view of the area surrounding break-away assembly 20. FIGS. 5 and 6 are full and partial perspective views of mid-boom section 14 and boom tip 12 in a rearward break configuration, relative to travel direction T shown in FIG. 1. FIGS. 7 and 8 are full and partial perspective views of mid-boom section 14 and boom tip 12 in a forward break configuration. FIG. 9 is a partial perspective view of the break-away joint in an upward break configuration.

As most easily seen in FIG. 6, in an exemplary embodiment, boom tip 12 includes end plate 28, and mid-boom section 14 includes end plate 30. Hinge assembly 22 is positioned between end plates 28 and 30. While the term "plate" is used, it is to be understood that plates 28 and 30 need not be flat. On one side of the joint between main boom portion 14 and boom tip 12, end plate 28 is disposed at an end of boom tip 12. On the other side of the joint between main boom portion 14 and boom tip 12, end plate 30 is disposed at an end of main boom portion 14. End plates 28, 30 are in a first position with respect to each other when the boom tip 12 assumes a neutral position relative to mid-boom section 14, as shown in FIGS. 1-4.

In an exemplary embodiment, break-away assembly 20 includes upper joint 32, a first hinge 34, a second hinge 36, and mid-joint 72. In the illustrated embodiment, upper joint 32 is connected to both mid-boom section 14 and boom tip 12; first hinge 34 is connected to plate 30; and second hinge 36 is connected to plate 28. Upper joint 32 may include, for example, a ball joint 38. Mid-joint 72 may include, for example, a ball joint 80.

First hinge 34 and second hinge 36 are connected by hinge connecting bar 40. The connection of first hinge 34 and second hinge 36 by hinge connecting bar 40 forms a rigid structure that is able to withstand considerable forces. In an exemplary embodiment, first hinge 34 is mounted to plate 30 by bracket 42 and is removably seated in first seat 44, which is mounted to plate 28. Second hinge 36 is mounted to plate 28 by bracket 46 and is removably seated in second seat 48, which is mounted to plate 30.

In an exemplary embodiment, break-away assembly 20 allows boom tip 12 to break away to the rear or front of agricultural vehicle 100, or upward, without damaging boom arm 11 or boom tip 12 when boom tip 12 impacts an obstacle or when a sufficient force is otherwise be applied to boom tip 12. The maximum angle that boom tip 12 may rotate may be limited by a backstop, the maximum compressibility of spring 50, or another feature. When boom tip 12 breaks away from mid-boom section 14 in a rearward (as shown in FIGS. 5 and 6) or forward (as shown in FIGS. 7 and 8) or upward (as shown in FIG. 9) direction in response to a first force, springs 50 create a second force opposing and absorbing the force causing the breaking away.

For example, as boom tip 12 breaks away from mid-boom section 14, springs 50 compress (compare the length of the springs 50 in the breakaway configurations of FIGS. 6 and 8 and the neutral configuration of FIG. 4). Thus, the force causing boom tip 12 to break away transfers into springs 50. When the force causing boom tip 12 to break away is no longer present, boom tip 12 returns to its neutral position as shown in FIG. 4 by the compression pressure in springs 50. Primary functions of the springs 50 include maintaining the boom tip 12 in the neutral position relative to mid-boom section 14 and returning the boom tip 12 to the neutral position after breaking away. A spring constant of the springs 50 generates a break-away threshold; when the threshold force on boom tip 12 has been exceeded, then boom tip 12 breaks away from the neutral position.

Springs 50 may also include a built-in dampening feature, such as in the case where springs 50 are gas springs, so that break-away assembly 20 does not slam shut when boom tip 12 returns back to its neutral position. Two springs 50 are shown in the illustrated embodiment. However, it is contemplated that more or fewer springs can be used to provide the desired pressure and dampening features.

As boom tip 12 breaks away from mid-boom section 14, end plates 28, 30 move with respect to each other about first hinge axis 25a (labeled in FIG. 4), second hinge axis 25b, and/or a pivot point defined by ball joint 38. In an exemplary embodiment, at least one of first hinge seat 44 and second hinge seat 48 releases from hinge connecting bar 40 in response to the first force causing boom tip 12 to break away. Which one (or both) of first hinge seat 44 and second hinge seat 48 releases depends upon the direction from which the force is coming. For example, as shown in FIGS. 5 and 6, a force coming from a front of crop sprayer 100 causes first hinge seat 44 to release from hinge connecting bar 40. In this case, first hinge 34 remains attached to plate 30 while first seat 44 remains attached to plate 28. Boom tip 12 pivots with respect to mid-boom section 14 along hinge axis 25a (shown in FIG. 4) between second hinge 36 and upper joint 32. In another example, as shown in FIGS. 7 and 8, a force coming from a rear of crop sprayer 100 causes second hinge seat 48 to release from hinge connecting bar 40. In this case, second hinge 36 remains attached to plate 28 while second seat 48 remains attached to plate 30. Boom tip 12 pivots with respect to mid-boom section 14 along hinge axis 25b between first hinge 34 and upper joint 22. As shown in FIG. 9, with an upward break of boom tip 12, both first hinge 34 and second hinge 36 come out of their respective first seat 44 and second seat 48.

As shown in FIGS. 6, 8 and 9, in an exemplary embodiment, each of first seat 44 and second seat 48 is sized and shaped to fit snugly about hinge connecting bar 40. For example, in the illustrated embodiment, hinge connecting bar 40 is formed from a tube with a substantially square cross-section. Thus, first seat 44 and second seat 48 each have a resilient insert 52 with a substantially square cut-out portion, as illustrated. When boom tip 12 is in the neutral position shown in FIGS. 1-4, the flat sides of hinge connecting bar 40 mate with the resilient insert 52 of each of first seat 44 and second seat 48. In an exemplary embodiment, first seat 44 receives a portion of connecting bar 40 proximate first hinge pin 34, and second seat 48 receives a portion of connecting bar 40 proximate second hinge pin 36.

In an exemplary embodiment, the hinge axes 25a, 25b of hinge assembly 22 are not normal or perpendicular with respect to the bottom surface 24 of boom arm 11 (which, when its associated sprayer 100 is disposed on a horizontal surface, is also generally horizontal). Rather, as shown in FIG. 4, each hinge axis 25a, 25b of hinge assembly 22 is disposed at an acute angle alpha with respect to a line 26 that is perpendicular to generally horizontally extending bottom surface 24 of boom arm 11. In an exemplary embodiment, alpha is between about 10 degrees and about 20 degrees, and is most suitably about 15 degrees. Because of this inclination, boom tip 12 becomes aligned slightly upward as well as forward (as shown in FIGS. 7 and 8) or rearward (as shown in FIGS. 5 and 6) relative to mid-boom section 14 when pivoted on hinge axis 25a or 25b. When the obstacle that caused the forward or rearward pivoting of boom tip 12 relative to mid-boom section 14 is passed, gravity assists in returning boom tip 12 to the neutral position shown in FIGS. 1-4. Other angles outside of the 10-20 degree range may be used, but smaller angles will not offer as much gravity assistance for the boom tip return to its unpivoted position, and larger angles will result in additional stresses on hinge assembly 22. While each of hinges axes 25a, 25b is illustrated as being angled from line 26 at the same angle alpha, it is contemplated that in another embodiment, the hinge axes 25a, 25b can be angled from line 26 at different acute angle.

In an exemplary embodiment, a first end of each gas spring 50 is pivotally mounted to boom tip 12 at pin 54. A second end of each spring 50 is pivotally mounted to lever 56 at pin 58 to move with lever 56. Lever 56 is in turn pivotally mounted to boom tip 12 at pin 60. Thus, each gas spring 50 is mounted on boom tip 12 proximate end plate 28, on bracket 59 of upper truss member 61. While an exemplary location for springs 50 is illustrated and described, it is contemplated that springs 50 may also be positioned in another location while still serving to generate a break away threshold force, serving to assist in returning the boom tip 12 to the neutral position shown in FIGS. 1-4, and dampening such return motion.

In an exemplary embodiment, lever 56 has a triangular configuration in which first arm 62 connects pins 58 and 60; second arm 64 connects pins 58 and 66; and third arm 68 connects pins 60 and 66. Each of pins 58, 60 and 66 is pivotally mounted relative to lever 56. One end of an elongated member such as rod 70 passes through a bore in pin 66 to indirectly connect to springs 50 via lever 56. Another end of rod 70 is connected to plate 30 at mid-joint 72. In an exemplary embodiment, mid-joint 72 is positioned approximately mid-way vertically (vertically meaning parallel with line 26 in FIG. 4) between upper joint 32 and hinge assembly 22; mid-joint 72 is positioned approximately at the same position horizontally (horizontally meaning perpendicular to line 26 in FIG. 4) as upper joint 32; and mid-joint 72 is spaced away from end plate 30 by a greater distance than a distance between upper joint 32 and end plate 30 (as shown in FIGS. 8 and 9).

Figure 10:
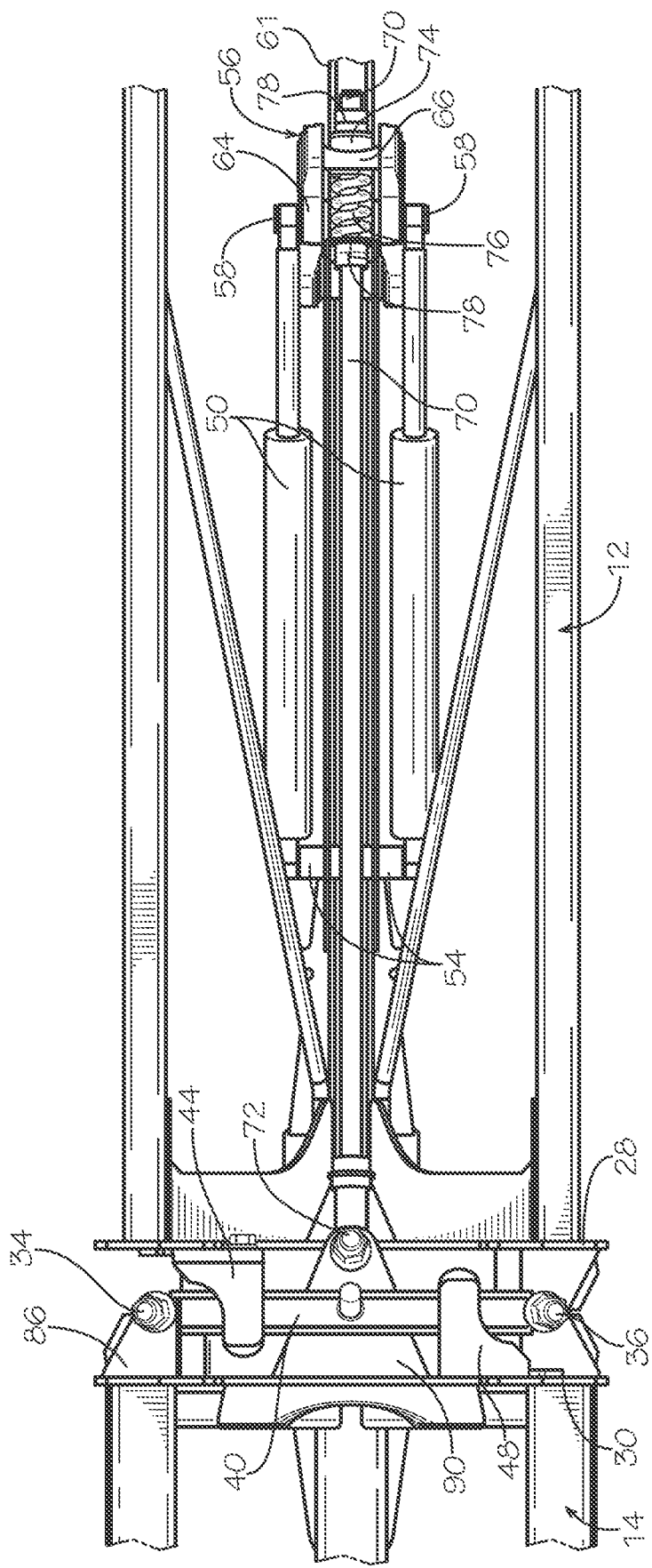
FIG. 10 is a bottom view of a joint between the mid-boom section and the boom tip in a neutral position, as depicted in FIGS. 1-4.

As shown in FIG. 10, pin 74 surrounds a portion of rod 70 and also passes through pin 66. On the other side of pin 66, spring 76, which in an exemplary embodiment is a helical coil spring, surrounds a portion of rod 70. Nuts 78 are tightened upon rod 70 outside of spring 76 and pin 74 to secure rod 70 to lever 66. An opposite end of rod 70 is secured to mid-joint 72 at ball joint 80 (visible in FIG. 6). Upper joint 32 and mid-joint 72 are similarly configured, with ball joint 38, 80 held in place by nuts 82 onto brackets 84, 86, 88, 90, which are in turn attached to end plate 30.

As shown in the neutral position of boom arm 11 depicted in FIG. 4, pin 66 of lever 56 is in its highest position. With either a rearward break, as shown in FIG. 6; or a forward break, as shown in FIG. 8; or an upward break, as shown in FIG. 9, lever 56 swings down upon pivot pin 60 because the breaking away of boom tip 12 increases a distance between pin 60 and mid-joint 72. This movement of lever 56 results in compression of springs 50. Horizontal and vertical movement of rod 70 is accommodated at mid joint 72 by ball joint 80. At lever 56, a component of the swiveling motion of rod 70 in a horizontal plane (i.e., parallel with bottom surface 24 of boom arm 11) is accommodated by spring 76. At lever 56, vertical motion of rod 70 is accommodated by pivoting of rod 70 at pin 66. These structures allow for the swiveling movement of rod 70 and spring 76 in three dimensions, so that rod 70 can transfer both compression and tension forces between mid-boom section 14 and boom tip 12 without bending. By moving lever 56, rod 70 transfers the motion of the breaking away of boom tip 12 to springs 50 when rod 70 pulls upon lever 56 during the rearward, forward, or upward breaking away actions, as illustrated in FIGS. 6, 8 and 9.

From the rearward break configuration of FIG. 6, the forward break configuration of FIG. 8, or the upward break configuration of FIG. 9, a rebound back to the neutral configuration of FIG. 4 is dampened by springs 50. Moreover, in an exemplary embodiment, compression spring 76 (FIG. 10) reduces shocks. In a typical rebound, a settling back to the neutral position of FIGS. 1-4 involves some back and forth motion in all three dimensions. Thus, the springs 50 and compression spring 76 smooth out such rebound and associated aftershocks.

In the illustrated embodiment, each spring 50 is a gas spring, such as one commercially available from SUSPA Incorporated of Grand Rapids, Michigan. However, in other embodiments, the spring could be a compression coil spring or any other means of reacting to the changes in length caused by rod 70 pulling and pushing upon lever 56. A spring with an appropriate spring constant can be selected depending on factors such as a mass, length and center of gravity of boom tip 12. Other factors that can be taken into consideration to determine an appropriate spring constant for keeping the boom tip 12 straight compared to the mid-boom section 14 include factors such as field contour or acceleration needs, for example. With a lower spring constant, boom tip 12 breaks away more easily, while a higher spring constant results in a bottom tip 12 that requires higher forces to break away, thus generating a higher holding force. In an exemplary embodiment, the break-away motion is progressive in that the greater the angle of boom tip 12 away from the neutral position, the less force is required to continue the break-away motion. Changing the spring pressure can be accomplished in a variety of manners. For example, one can physically exchange springs when higher or lower holding force is desired. In another example, springs with variable or adjustable spring constants can be used.

While break-away assembly 20 has been described with reference to boom arm 11, it is contemplated that the described assembly can be used with other structures to provide for a tri-directional break-way mechanism that automatically returns to a neutral position, with optional dampening provided by a spring with an integrated damper function or a separate damper.

Although the subject of this disclosure has been described with reference to several embodiments, workers skilled in the art will recognize that changes may be made in form and detail without departing from the spirit and scope of the disclosure. While a particular configuration of break-away mechanism 20 is described, it is contemplated that variations may be made. For example, while a particular arrangement of elements is shown, it is contemplated that parts of a break-away mechanism may be assembled otherwise. For example, while the illustrated embodiment shows a structure in which certain elements are attached to mid-boom section 14 and other elements are attached to boom tip 12, it is contemplated that these attachments may be reversed or otherwise varied.

What is claimed is:

1. A boom arm assembly comprising:
   a main boom;
   a boom tip configured to assume a neutral position and to pivot to a forward position, a rearward position, and an upward position relative to the main boom;
   an upper ball joint connecting the main boom to the boom tip;
   a first hinge connected to the main boom, the first hinge having a first hinge axis defined between the upper ball joint and the first hinge;
   a second hinge connected to the boom tip, the second hinge having a second hinge axis defined between the upper ball joint and the second hinge;
   a hinge connecting bar connecting the first hinge to the second hinge;
   a first hinge seat attached to the main boom and having a resilient insert shaped to fit about a first portion of the hinge connecting bar;
   a second hinge seat attached to the boom tip and having a resilient insert shaped to fit about a second portion of the hinge connecting bar; and
   a spring assembly connecting the boom tip to the main boom at a second ball joint, the spring assembly comprising a first spring and an elongated rod, wherein the first spring applies a holding force on the boom tip toward the main boom such that the spring assembly provides a break-away threshold;
   wherein the boom tip is movable relative to the main boom about the first hinge axis, the second hinge axis, and a pivot point defined by the upper ball joint when the break-away threshold is exceeded;
   wherein the first spring urges the boom tip toward the neutral position relative to the main boom when the boom tip is not in the neutral position.

2. The boom arm assembly of claim 1, wherein the first spring comprises a gas spring.

3. The boom arm assembly of claim 1, wherein the first spring comprises a plurality of springs.

4. The boom arm assembly of claim 1, wherein a rearward force acting on the boom tip and exceeding the break-away threshold causes the first hinge seat to release the hinge connecting bar such that the boom tip pivots relative to the main boom about the second hinge axis, and wherein a forward force acting on the boom tip and exceeding the break-away threshold causes the second hinge seat to release the hinge connecting bar such that the boom tip pivots relative to the main boom about the first hinge axis, and wherein an upward force acting on the boom tip and exceeding the break-away threshold causes both the first and second hinge seats to release the hinge connecting bar such that the boom tip pivots upward about the upper ball joint.

5. The boom arm assembly of claim 4, wherein the spring assembly further comprises a lever pivotally mounted to the boom tip with a first pin connection and connecting the elongated rod to the first spring, wherein a first end of the first spring is pivotally mounted to the boom tip and a second end of the first spring is pivotally mounted to the lever at a second pin connection.

6. The boom arm assembly of claim 5, wherein the lever has a triangular configuration including the first pin connection, the second pin connection, and a third pin connection, and wherein one end of the elongated rod connects to the third pin connection.

7. The boom arm assembly of claim 6, wherein the lever is configured to swing downward about the first pin connection when the boom tip moves from the neutral position, wherein such movement of the lever results in compression of the first spring.

8. The boom arm assembly of claim 6, further comprising a second spring proximate the third pin connection adjacent the elongated rod and the lever.

9. The boom arm assembly of claim 8, wherein the second spring comprises a helical coil spring surrounding a portion of the elongated rod.

10. The boom arm assembly of claim 1, further comprising a lever, wherein the lever has a first portion connecting the lever and the boom tip, a second portion connecting the lever and the first spring, and a third portion connecting the lever and the elongated rod.

11. The boom arm assembly of claim 10, wherein the first spring has first and second ends, wherein the first end is pivotally connected to the boom tip, and wherein the second end is pivotally connected to the lever.

12. The boom arm assembly of claim 1, wherein the first hinge axis and the second hinge axis are each tilted at an acute angle relative to a vertical line such that the boom tip pivots upward when the boom tip pivots forward or rearward.

13. The boom arm assembly of claim 1, wherein the hinge connecting bar defines an upper surface and a lower surface, and wherein the upper surface and the lower surface are each in contact with the first hinge seat and the second hinge seat when the boom tip is in the neutral position.

14. A sprayer vehicle, comprising:
a frame supported by a plurality of wheels;
an engine carried by the frame and configured to drive at least one of the plurality of wheels;
a storage tank carried by the frame;
a main boom carried by the frame;
a boom tip configured to assume a neutral position and to pivot to a forward position, a rearward position, and an upward position relative to the main boom;
an upper ball joint connecting the main boom to the boom tip;
a first hinge connected to the main boom, the first hinge having a first hinge axis defined between the upper ball joint and the first hinge;
a second hinge connected to the boom tip, the second hinge having a second hinge axis defined between the upper ball joint and the second hinge;
a hinge connecting bar connecting the first hinge to the second hinge;
a first hinge seat attached to the main boom and having a resilient insert shaped to fit about a first portion of the hinge connecting bar;
a second hinge seat attached to the boom tip and having a resilient insert shaped to fit about a second portion of the hinge connecting bar; and
a spring assembly connecting the boom tip to the main boom at a second ball joint, the spring assembly comprising a first spring and an elongated rod, wherein the first spring applies a holding force on the boom tip toward the main boom such that the spring assembly provides a break-away threshold;
wherein the boom tip is movable relative to the main boom about the first hinge axis, the second hinge axis, and a pivot point defined by the upper ball joint when the break-away threshold is exceeded;
wherein the first spring urges the boom tip toward the neutral position relative to the main boom when the boom tip is not in the neutral position.

15. The sprayer vehicle of claim 14, wherein the hinge connecting bar defines an upper surface and a lower surface, and wherein the upper surface and the lower surface are each in contact with the first hinge seat and the second hinge seat when the boom tip is in the neutral position.

* * * * *